US007552636B2

(12) United States Patent
Datskos

(10) Patent No.: US 7,552,636 B2
(45) Date of Patent: Jun. 30, 2009

(54) ELECTRON/HOLE TRANSPORT-BASED NEMS GYRO AND DEVICES USING THE SAME

(75) Inventor: Panos Datskos, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 70 days.

(21) Appl. No.: 11/736,409

(22) Filed: Apr. 17, 2007

(65) Prior Publication Data

US 2008/0257041 A1    Oct. 23, 2008

(51) Int. Cl.
*G01P 3/44* (2006.01)
*G01P 3/00* (2006.01)

(52) U.S. Cl. .................................... 73/504.04; 73/510

(58) Field of Classification Search ............. 73/504.02, 73/504.04, 504.12, 504.14, 504.15, 493, 73/510, 511
See application file for complete search history.

(56) References Cited

U.S. PATENT DOCUMENTS

| 5,438,411 | A | 8/1995 | Kersey | |
|---|---|---|---|---|
| 6,713,829 | B1 | 3/2004 | Karpman | |
| 6,909,221 | B2* | 6/2005 | Ayazi et al. | 310/321 |
| 6,918,186 | B2* | 7/2005 | Ash et al. | 33/313 |
| 7,023,065 | B2* | 4/2006 | Ayazi et al. | 257/414 |
| 7,352,178 | B2* | 4/2008 | Pullini et al. | 324/252 |
| 2002/0167374 | A1* | 11/2002 | Hunt et al. | 333/186 |
| 2006/0243023 | A1* | 11/2006 | Wong | 73/1.15 |
| 2006/0285789 | A1* | 12/2006 | Michalewicz et al. | 385/14 |
| 2008/0149479 | A1* | 6/2008 | Olofsson et al. | 204/403.14 |

OTHER PUBLICATIONS

Gallacher et al., The Application of Parametric Excitation to a Micro-Ring Gyroscope, Technical Proceedings of the 2004 Nanotechnology Conference Trade Show, vol. 1, Chapter 8, pp. 359-362, 2004..
Hasselbach et al., Sagnac experiment with electrons: observation of the rotational phase shift of electron waves in vacuum, Phys. Rev. A. At. Mol. Opt. Phys., 48, pp. 143-151, Jul. 1993.

* cited by examiner

*Primary Examiner*—Helen C. Kwok
(74) *Attorney, Agent, or Firm*—Novak Druce + Quigg LLP; Gregory A. Nelson; Gregory M. Lefkowitz

(57) ABSTRACT

A nanomechanical (NEMS) gyroscope includes an integrated circuit substrate, a pair of spaced apart contact pads disposed on the substrate, and a movable nanoscale element forming at least a portion of a first electrically conductive path electrically coupling the contact pads. The movable element experiences movement comprising rotation, changes in rotation, or oscillation upon the gyroscope experiencing angular velocity or angular acceleration. Movement of the gyro introduces geometrically induced phase changes which results in phase and/or frequency changes in ac current flowing through the movable element. An inertial measurement unit (IMU) can include an integrated circuit substrate having a three axis gyroscope formed on the substrate and a three axis accelerometer, which is preferably formed on the same substrate.

16 Claims, 10 Drawing Sheets

Accel Board Assembly

ELECTRON/HOLE TRANSPORT-BASED NEMS GYRO AND DEVICES USING THE SAME

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATIONS

Not applicable.

FIELD OF THE INVENTION

The invention relates to gyroscopes and more particularly gyroscopes based on electron or hole propagation through solid state media.

BACKGROUND OF THE INVENTION

Gyroscopes are commonly used as sensors for measuring angular velocity in many applications including navigation and guidance, as well as for control stabilization. Although, conventional rotating wheel, fiber optic and ring laser gyroscopes have dominated a wide range of applications, they are too large and often too expensive to be used in emerging applications. Navigation and guidance systems generally utilize gyroscopes together with accelerometers.

FIG. 1 is a block diagram of a known inertial reference unit (IRU) 100. IRU 100 includes a sensor unit 112 which typically includes one or more of gyroscopes and accelerometers which provide inertial signals 114 to processor 116. Sensor unit 112 is generally referred to herein as a primary sensor unit. Processor 116 is programmed to take inertial signals 114 from processor 116 and output inertial data 118 to input/output (I/O) unit 120. I/O unit 120 forwards inertial data 118 to an output bus 122, which is connected to a connector 124 of IRU 100, thereby providing inertial data 118 to other systems within an aircraft, including a display presented to a pilot of the aircraft. As used herein, inertial data generally includes attitude data (e.g. pitch, roll, and heading of the aircraft).

Other functional interfaces are provided at connector 124 of IRU 100, including, but not limited to, an input data bus 130, control discretes 132, status discretes 134, and input power 136. Input power 136 is routed to an internal power supply 140 which generates the specific power requirements for each of sensor unit 112, processor 116, and input/output (I/O) unit 120.

IRU 100 is generally housed in a chassis (not shown), which conforms to particular form factor requirements. The chassis and mounting apparatus includes features for securing IRU 100 in accurate alignment with the aircraft body thereby providing an attitude reference with respect to the aircraft body. Examples of form factors for known IRUs, such as IRU 100, include four MCU and ten MCU. MCU Stands for Modular Concept Unit, which is an industry standard for air transport avionics. A ten MCU chassis is about 12.69 inches wide, 12.5 inches deep and about 7.64 inches high.

Recent advances in micro-machining technology have made the design and fabrication of Micro-Electro-Mechanical Systems (MEMS) sensors including MEMS gyroscopes and accelerometers possible which provide the required small size. Regarding gyroscopes, MEMS devices are several orders of magnitude smaller than conventional mechanical gyroscopes, and can be fabricated in large quantities by conventional batch semiconductor processing. Thus, there is great potential to significantly fabrication cost. The emergence of MEMS gyroscopes is opening up new market opportunities and applications in the area of low-cost to medium performance inertial devices.

Most MEMS gyroscopes are laminar vibratory mechanical structures fabricated on polysilicon or single crystal silicon. Common fabrication steps include bulk micromachining, wafer to-wafer bonding, surface micromachining, and high aspect ratio micromachining. Each of these fabrication steps involves multiple process steps such as deposition, etching and patterning of various materials.

Conventional gyroscopes are based light propagation which utilize the Sagnac effect. The Sagnac effect is used in an arrangement referred to as a ring interferometry or a Sagnac interferometer. In such devices, a beam of light is split and the two resulting light beams are made to follow a trajectory in opposite directions. To act as a ring the trajectory must enclose an area. On return to the point of entry the light is allowed to exit the apparatus in such a way that an interference pattern is obtained. The position of the interference fringes is dependent on angular velocity of the setup.

Usually several mirrors are used, so that the light beams follow a triangular or square trajectory. Fiber optics can also be employed to guide the light. The ring interferometer is located on a platform that can rotate. When the platform is rotating the lines of the interference pattern are displaced sideways as compared to the position of the interference pattern when the platform is not rotating. The amount of displacement is proportional to the angular velocity of the rotating platform. The axis of rotation does not have to be inside the enclosed area.

When the platform is rotating, the point of entry/exit moves during the transit time of the light. So one beam has covered less distance than the other beam. This creates the shift in the interference pattern. Therefore the interference pattern obtained at each angular velocity of the platform features a different phase-shift particular to that angular velocity.

The Sagnac effect is the electromagnetic counterpart of the dynamics of rotation. A gyroscope that can move around freely in a mounting can be used to measure the rotation of the mounting, and likewise, a Sagnac interferometer measures its angular velocity with respect to the local inertial frame.

Although light-based Sagnac gyroscopes are suitable for certain applications, interfacing such interferometers with detectors and signal processors requires transduction which adds to system complexity and cost, and can also add errors. Moreover, the inherent sensitivity provided by conventional Sagnac gyroscopes is not high enough for certain applications, such as high performance inertial measurement units (IMUs) needed for advanced navigation and guidance applications.

SUMMARY OF INVENTION

A nanomechanical (NEMS) gyroscope includes an integrated circuit substrate, a pair of spaced apart contact pads disposed on the substrate, and a movable element forming at least a portion of a first electrically conductive path electrically providing electrical coupling between the contact pads. The movable element experiences movement comprising rotation, changes in rotation, or oscillation upon the gyroscope experiencing angular velocity or angular acceleration. The movement induces phase changes in current flow through the movable element.

The gyroscope can be embodied as a three-axis gyroscope comprising three gyroscopes, wherein the respective gyroscopes are positioned such that a measuring axis for each of the gyroscopes is orthogonal to a measuring axis for other gyroscopes. The movable element can comprises a suspended nanoconstriction. In a one embodiment, the nanoconstriction is <50 nm wide.

In another embodiment, the gyroscope can comprise an interferometric arrangement comprising a first electrically conductive path and at least a second fixed electrically conductive pathway both providing coupling between the contact pads. In one embodiment, the second pathway is secured to the substrate.

An inertial measurement unit (IMU) comprises a three-axis accelerometer for detecting acceleration and deceleration for all three orthogonal measuring axes, and a three axis gyroscope formed on an integrated circuit substrate. The gyroscope measures rotational rates along all three orthogonal rotational axes. The gyroscope comprises a movable nanoscale element forming at least a portion of a first electrically conductive path electrically coupling the contact pads, wherein the movable element experiences movement comprising rotation, changes in rotation, or oscillation upon the gyroscope experiencing angular velocity or angular acceleration, the movement inducing phase changes in current flowing through the movable element. The IMU can further comprise a GPS circuit. In this embodiment the accelerometer and GPS can both be disposed on the same substrate.

The IMU can further comprise a gyro logic circuit formed on the substrate which is responsive to the three-axis gyroscope for producing an inertial angular rate about the 3 axes, an accelerometer logic circuit on the substrate responsive to the three-axis accelerometer assembly for producing a non-gravitational acceleration along each accelerometer input axis; and a processor on the substrate responsive to the gyroscope logic circuit and the accelerometer logic circuit for determining attitude and position. The movable element can comprises a nanoconstriction. In another embodiment, the gyroscope comprises an interferometric arrangement comprising a first electrically conductive path and at least a second fixed electrically conductive pathway both coupling the contact pads. In one embodiment the second pathway is secured to the substrate.

A method for detecting angular velocity or angular acceleration, comprises the steps of forcing an alternating current through a nanomechanical (NEMS) gyroscope comprising an integrated circuit substrate, a pair of spaced apart contact pads disposed on the substrate, and a movable nanoscale element forming at least a portion of a first electrically conductive path electrically coupling the contact pads, and measuring a change in at least one parameter of the alternating current resulting from rotation or oscillation of the suspended element upon angular velocity or angular acceleration of the gyroscope. The oscillation or rotation induces phase changes in current flowing through the suspended element. The angular velocity or angular acceleration is then determined from the parameter.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 1:
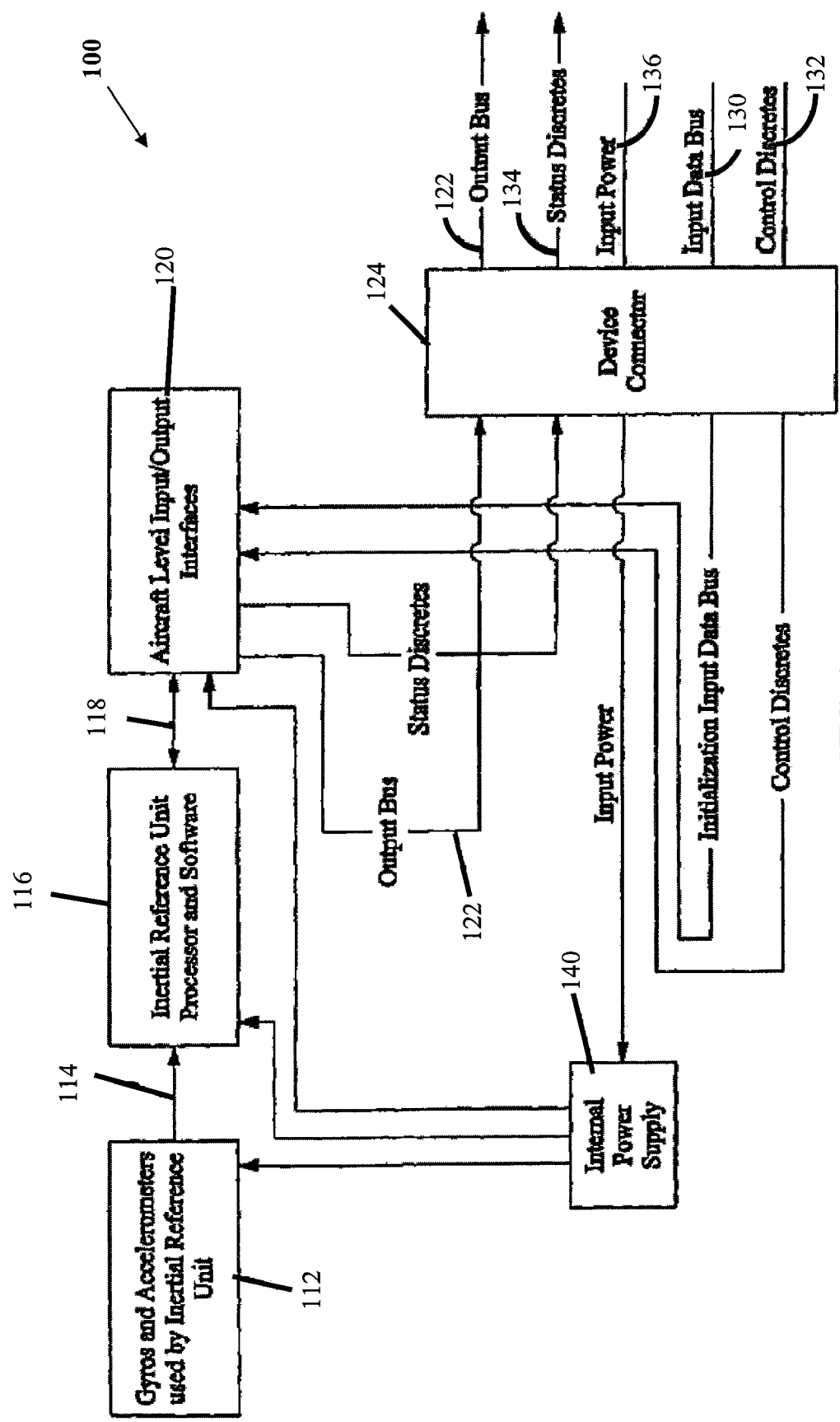
FIG. 1 is a block diagram of a known inertial reference unit (IRU) for an aircraft application.

The present invention describes an integrated NEMS gyroscope device which is based on electron or hole transport through solid state media. As used herein, "NEMS" refers to the gyro having at least one nanoscale dimension, such as the width an electrically conducting or semiconducting pathway. Being an integrated device, related electronics and other sensing/detection devices (e.g. accelerometers, GPS and temperature sensors) can be disposed on the same die or the same PC board as the gyro and interfaced easily since no optical to electrical transduction is required. The Inventor has found that if the size of at least a portion of the nanoscale element is sufficiently small, movement of the gyro introduces geometrically induced phase changes which results in phase and/or frequency changes in ac current flowing through the movable element.

In operation, electron or hole transport is altered (phase shifted) when the gyro undergoes an angular velocity or an angular acceleration. Measurement of the phase shift of current flowing through the device allows the angular velocity or angular acceleration to be determined. In contrast, conventional gyroscopes are based light propagation, such as using a ring interferometer based on the Sagnac effect. Interfacing related electronics with such conventional devices requires transduction, adds complexity and can introduce errors.

A nanomechanical (NEMS) gyroscope according to the present invention comprises an integrated circuit substrate (e.g. Si, GaAs, Si/Ge), a pair of spaced apart electrically conductive contact pads disposed on the substrate, and a movable element forming at least a portion of a first electrically conductive path electrically coupling the contact pads. In operation, the suspended element is set into rotation, changes in rotation or oscillation occurs upon the gyroscope experiencing angular velocity or angular acceleration, wherein the oscillations induce phase changes in electrons or holes flowing through the suspended element. The phase changes result in a change in a measurable, generally comprising a measurable related to current flowing through the device, such as a frequency shift, amplitude, and the Q-factor in the current signal since mechanical energy loses will be affected.

Although not seeking to be bound to theory, the theory not being required to practice the present invention, Applicant provides the following theoretical details believed to explain operation of gyroscopes according to the present invention. Devices according to the invention sense angular velocity or angular acceleration using changes caused in the electron wavefunction in NEMS devices resulting from geometrical changes in the potential where the particles (electrons/holes) propagate. Electrons moving in a low-dimensionality waveguide are subject to a geometrical potential which arises as the electron gas "flexes". The geometric potential is always positive and is independent of the electric charge and it vanishes as $\hbar$(Plank's constant divided by $2\pi$)→0. The geometric potential can therefore influence the electron wavefunction by introducing phase shifts. Phase shifts are important because they can lead to either constructive or destructive quantum interference.

For example, using an interferometric arrangement, as electrons split (not necessarily equally) along two independent nanomechanical paths and subsequently recombine a quantum interference can be observed. As the system undergoes angular acceleration or has an angular velocity the geometric potential will produce changes in the observed quantum interference.

In addition, structures operating under a related different phenomenon can also be utilized to produce a changes in observed quantum interference. The Inventor has found that electron current through a nanomechanical restriction if sufficiently small is influenced by the motion of the device. When a microbridge undergoes mechanical oscillations the current through the nanocontact is modulated. The motion of a mechanical device and electron or hole flow through that device can be influenced by varying external fields. Monitoring both electron or hole flow and resonance frequency shifts can provide accurate gyroscopic information:

$$V(r) = -\frac{\hbar^2}{2m}(2R)^{-2} \quad (1)$$

For a one dimensional system the Schroedinger's equation is $$-\frac{\hbar^2}{2m}\frac{d^2}{dx^2}\Psi + \frac{\hbar^2}{8mR^2(x)}\Psi = E\Psi \quad (2)$$

A geometric phase change can occur due to distortions in the path $$\phi = \oint <n|\nabla_R|n>dR \quad (3)$$

where |n> is the systems eigenstate. Then, the phase shift of the wavefunction will be:

$$\Delta\phi \approx \frac{\theta}{8k_F R} \quad (4)$$

where $k_F$ is the Fermi wavenumber and $\kappa_F$ is the change in the angular position. For example, $k_F$ in GaAs is $1.5\times10^6$ cm$^{-1}$ and for (100) Si $k_F\approx1\times10^6$ cm$^{-1}$. Introduction of changes in phase in the wavefunction will cause propagating particles to exhibit changes in the quantum interference. Because these changes are due to the geometric potential, angular acceleration or angular velocity will introduce such phase shifts.

Returning to the description of devices according to the invention, the output(s) of the gyroscope is (are) preferably connected to current measurement circuitry, such as a conventional discrete difference amplifier fed by the signal voltage across a current-sense resistor. Current measurement circuitry can be on the same chip as the gyroscope. In one embodiment, the gyroscope can comprise a three axis gyroscope comprising three (3) one-axis gyroscopes, wherein the gyroscopes are positioned such that a measuring axis for each of gyroscopes is orthogonal to a measuring axis of the other gyroscopes. FIG. 4B described below shows a gyro board assembly having gyro chips for each axis assembled on a board along with associated electronics implementing a 3-axis gyro. Although the present invention is generally described as a 1-axis gyro, if one of the gyro's arms is excited and the effect of rotation in the electron current in the oscillation arm is measured as the arm rotates, then the present invention can be a 3-axis gyro providing information from all three dimensions provided the excitation amplitude is high enough.

An accelerometer, preferably a three-axis accelerometer can also be provided with gyros according to the invention for detecting acceleration and decelleration for all three orthogonal measuring axes, thus forming an inertial measurement unit (IMU). In one embodiment, the accelerometer is formed on the same integrated circuit substrate as the gyro. The term IMU is widely used to refer to a box, containing 3 accelerometers and 3 gyroscopes and is also referred to as an inertial motion system. As well known in the art, an IMU is a closed system that is well known for use to detect altitude, location, and motion. Typically installed on aircraft or UAVs, it normally uses a combination of accelerometers and angular rate sensors (gyroscopes) to track how the craft is moving and where it is. Typically, an IMU detects the current acceleration and rate of change in attitude (i.e. pitch, roll and yaw rates) and then sums them to find the total change from the initial position.

IMUs are normally only one component of a navigation system. Other systems such as GPS (used to correct for long term drift in position), a barometric system (for altitude correction), or a magnetic compass (for attitude correction) are used to compensate for the limitations of an IMU.

Figure 5:
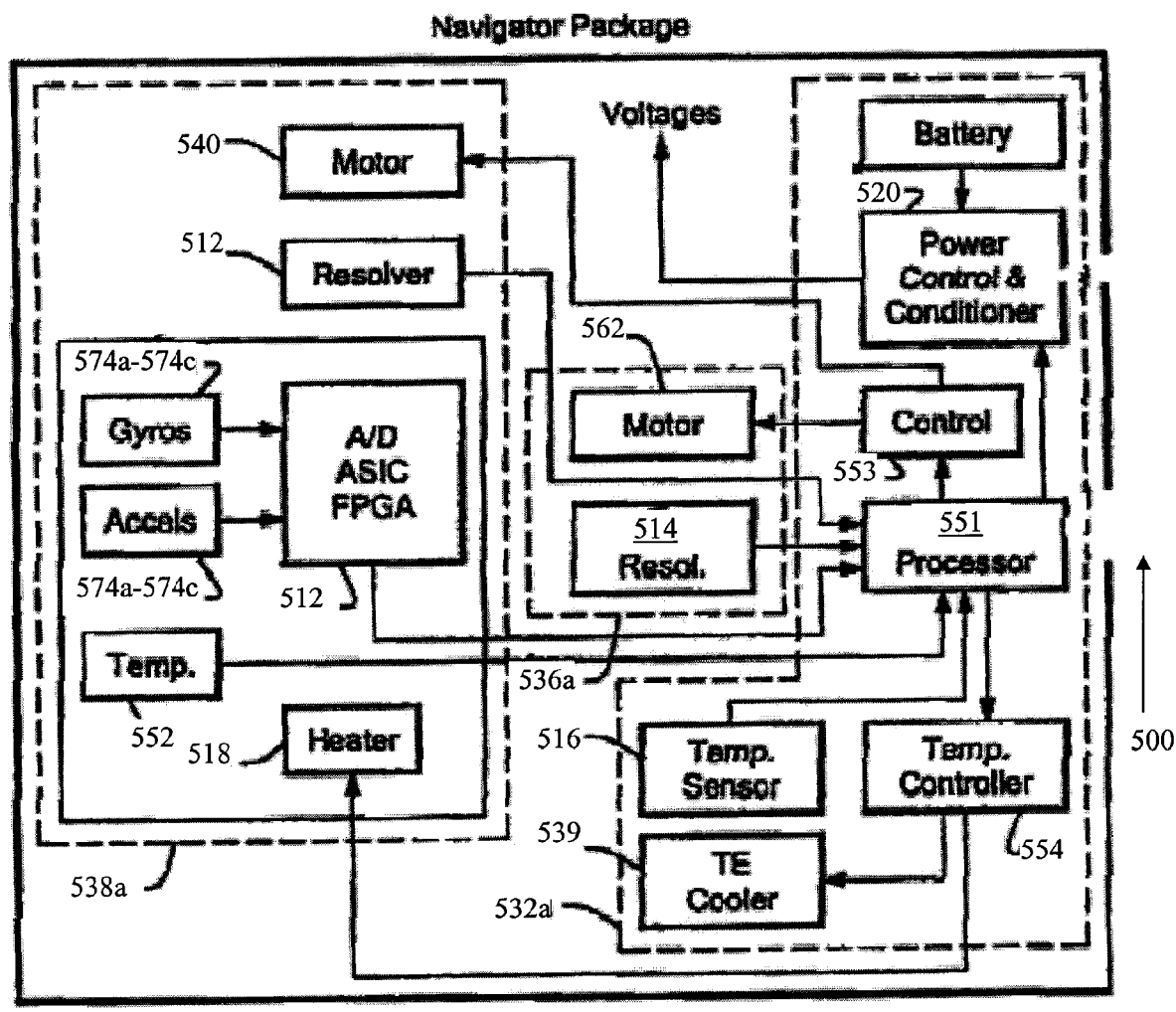
FIG. 5 is a functional block diagram of an exemplary navigation system according to an embodiment of the invention.

Along with gyros or accelerometers, electronic circuitry, such as the current measurement circuit described above, as well as an A/D converter, an ASIC, FPGA, processor, a controller, and GPS circuit can all be integrated on the same chip, or formed from a plurality of integrated components laid out on a circuit board. FIG. 5 described below is a functional block diagram of an exemplary navigation system according to an embodiment of the invention having many of these components.

Figure 2:
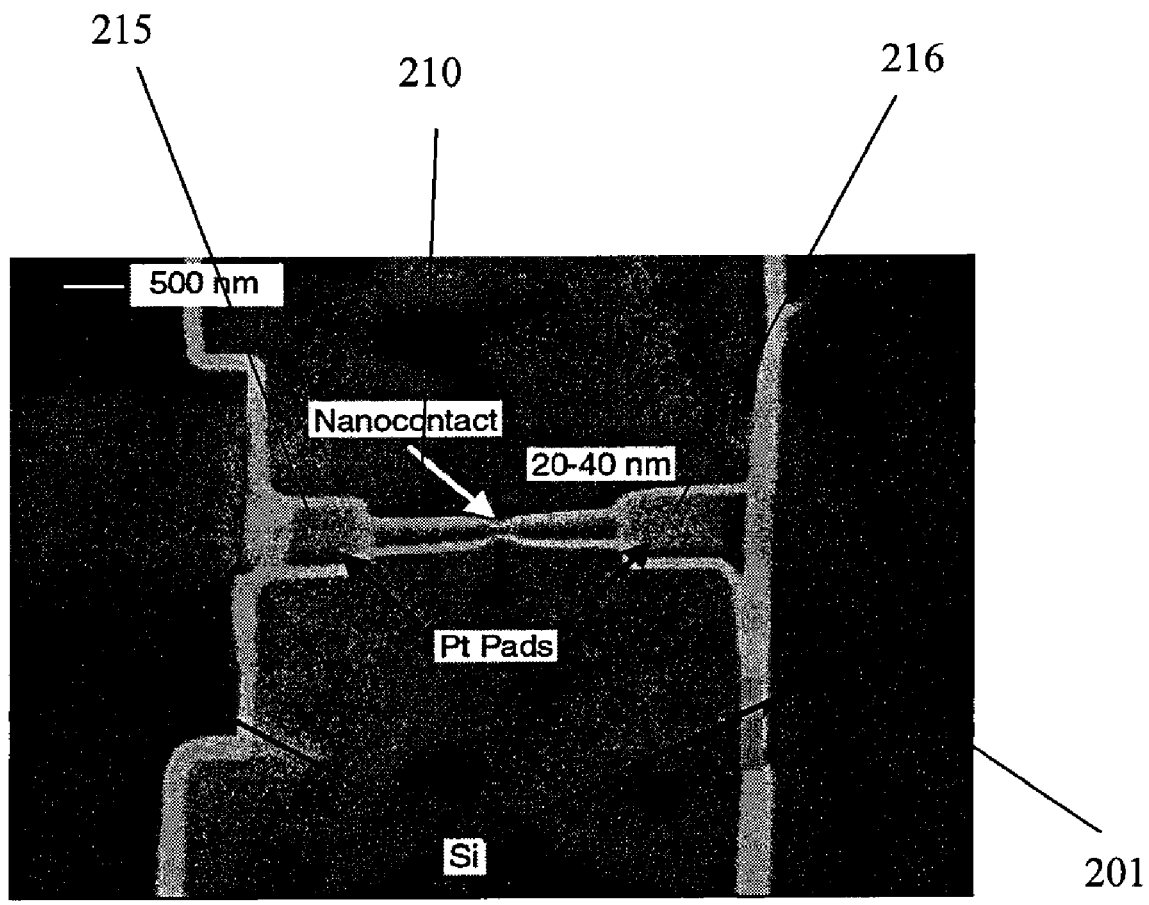
FIG. 2 is a scanned photograph showing a gyroscope embodied as a device having suspended nanoconstriction.

FIG. 2 is a scanned photograph showing a fabricated exemplary gyroscope 200 according to a first embodiment of the invention which utilizes a single suspended nanoconstriction formed on a substrate 201, such as a Si substrate. Mechanical nanoconstriction "bridge" 210 is defined by the length between the pads 215 and 216 shown as Pt pads and is free to move since the nanoconstriction 210 is a suspended element. Nanoconstriction "bridge" 210 includes a portion identified as nanocontact 211. The nanocontact 211 can be anywhere along the nanoconstriction bridge pathway, such as near the middle of the pathway shown in FIG. 2. The substrate 201

(including the contact pads to the nanoconstriction bridge 210) are rigidly held during operation while the nanoconstriction bridge 210 including nanocontact 211 undergoes generally oscillatory motion responsive to angular acceleration.

Gyroscope 200 can provide gyroscopic information by applying an a.c. bias signal between pads 215 and 216 to result in current flow and monitoring of the change in the current through the nanoconstriction bridge 210 as a function of rotation or changes in the rotation experienced by gyro 200. As the nanoconstriction bridge 210 undergoes rotation (or changes in rotation), the electron current through the nanoconstriction bridge 210 is modulated, wherein the change in current is dominated by nanocontact region. The restriction provided by nanocontact 211 needs to be small enough in order to observe quantum effects. Although nanocontact 211 is shown in FIG. 2 as being a restriction, the whole length can generally be thin (and thus be a restriction over its full length), only limited by mechanical integrity. It has been found that the restriction needs to be on the order a few nanometers (e.g. 1 to 50 nm) to exhibit the desired performance. As shown in FIG. 2, the narrowest point of nanocontact 210 can be 20 to 40 nm wide. Using three microbridges orthogonal to one another (not shown) information regarding each of the three dimensions can be obtained.

Nanoscale features of gyro 200 shown in FIG. 2 can be fabricated using a variety of known methods. For example, focused ion beam (FIB) milling used to form gyroscope 200 shown in FIG. 2 can be used. The contact pads 215 and 216 can be created by a FIB induced direct write metal deposition. Advantages of the arrangement shown in FIG. 2 include ease of fabrication, and better material control. In one embodiment (not shown), multiples nanobridges are used to form an interferometric arrangement. A plurality of bridges provides averaging which can be used to reduce noise. By increasing the signal to noise ratio, arrays of coherent bridges can be realized.

Depending on the axis of rotation there are different mechanisms believed to be operable for the nanoconstriction bridge 210:

(i) rotation of the plane of the gyro 200 causes a force that is proportional to the product of the rotation and the velocity due to oscillation, and (ii) rotation perpendicular to the plane of the gyro 200. The resulting effect will be due to inertial changes.

Figure 3A:
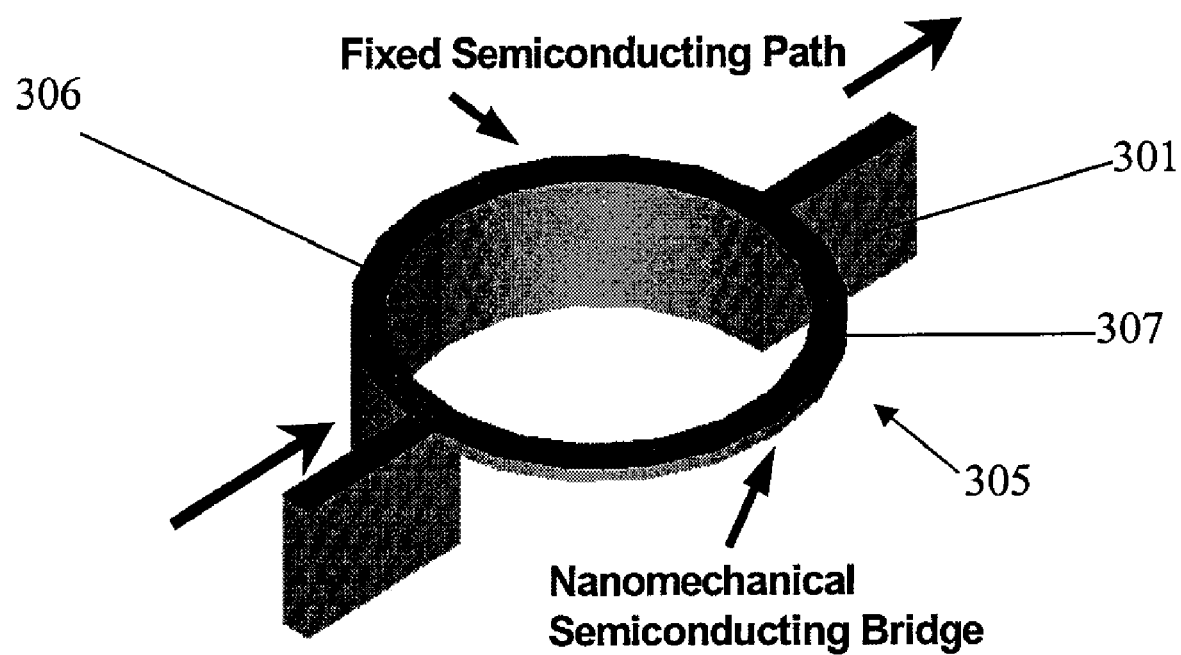
FIG. 3A is a depiction of a gyroscope embodied as a device having an interferometric arrangement including a nanomechanical semiconducting bridge.

FIG. 3A is a depiction of a gyroscope 300 according to a second embodiment of the invention embodied as an interferometric arrangement comprising a loop 305 comprising a first moveable electrically conductive path 307 and at least a second fixed electrically conductive pathway 306 coupling the contact pads 315 and 316 disposed on a substrate 301. Although a round loop 305 is shown, the loop 305 can be various shapes, including square or three dimensional loop arrangements.

The interferometric arrangement shown in FIG. 3A has the required at least two different waveguide paths. As shown in FIG. 3A, one path is a fixed path 306 and one path 307 is movable suspended nanobridge which is set into oscillation upon angular velocity or angular acceleration of the gyro 300. Dimensional ranges for nanobridge path 307 can generally includes at least two (2) nanoscale dimensions, such as thickness and width. Semiconducting materials or electrically conducting materials can be used for the respective paths. As noted above, using a three (3) gyroscope orthogonal arrangement, a 3D gyro can be realized.

As electrons or holes that enter the system (see the arrow shown in FIG. 3A), they are generally equally split between the two possible paths 306 and 307. Quantum interference will be observed depending on the phase difference between that is introduced as electrons or holes propagate through the system. The phase shift is then related to the path length (L) by:

$$\frac{\Delta\phi}{2\pi} = \frac{\Delta L}{\lambda} \quad (5)$$

where L is the path length and ΔL is the path length difference between the paths 306 and 307. Using Eqns (4) and (5) the path difference ΔL can be expressed as a function of the rotation angle θ(t) by $$\Delta L(t) = \frac{\theta(t)}{16\pi k_F R} L \quad (6)$$

Figure 3B:
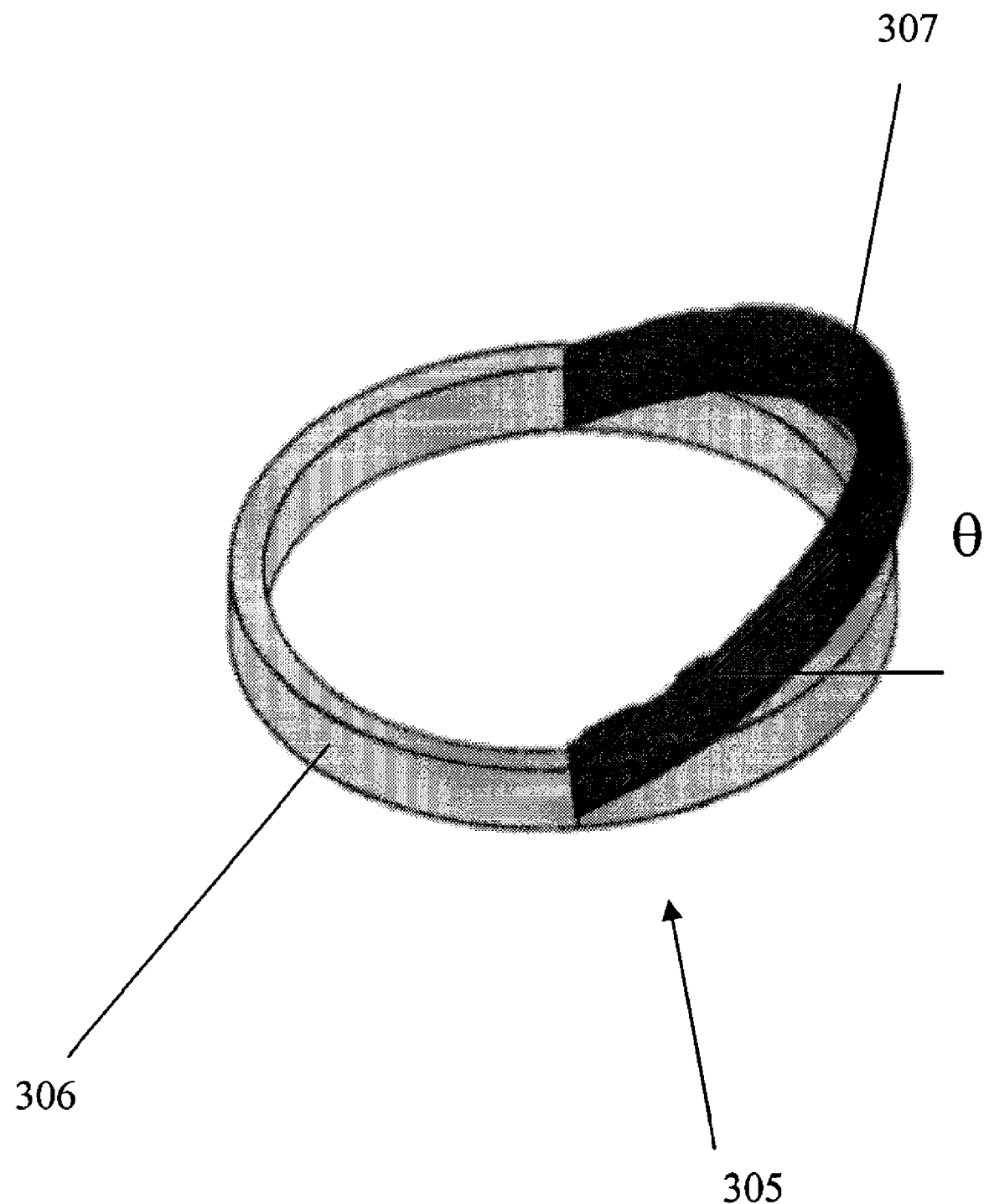
FIG. 3B shows the movable path of loop of the gyro shown in FIG. 3A rotated an angle θ from its rest position, where in its rest position the movable path is in the same plane as the fixed path.

FIG. 3B shows path 307 of loop 305 rotated an angle θ from its rest position, where in its rest position path 307 is in the same plane as path 306. For an angular velocity Ω the phase shift for an equivalent Sagnac loop enclosing an area A will be given by $$\Delta\phi = \frac{4\pi}{\lambda v}\vec{\Omega}\cdot\vec{A} \quad (7)$$

where A is the area of the loop 305 in FIG. 3. Equation (7) can be rewritten as a function of angular rotation as:

$$\Omega = \frac{\hbar c^2}{4E}\cdot\frac{\Delta\phi}{A} = \frac{\hbar c^2}{4E}\cdot\frac{\Delta\phi}{\pi d^2/4} = \frac{\hbar c^2 \Delta\phi}{\pi E}\cdot\frac{1}{d^2} \quad (8)$$

The above equation indicates that the accuracy of measured angular velocity has an inverse square dependence on the diameter of the loop. The path difference ΔL between two propagating waves in the loop is then given by $$\Delta L = 4\frac{\vec{\Omega}\cdot\vec{A}}{v} \quad (9)$$

The inherent sensitivity of a nanomechanical interferometer such a gyroscope 300 will exceed that of a conventional photon based system by a calculated factor of m $c^2/\hbar$ w≈$10^6$ (where m is the electron mass). The figure of merit for nanomechanical IMUs which is the noise equivalent Ω is given is estimated to have an unprecedented sensitivity of better than NEΩ<$10^{-12}$ cycles/second.

Although the loop 305 shown in FIGS. 3A and 3B has one path attached 306 to the substrate 301 and one path 307 suspended, both paths can be attached to the substrate or both paths can be suspended. If both paths are attached to the substrate 301 the device will operate as a pure electron-based Sagnac interferometer. In this arrangement one can measure the net change in orientation by to integrating over the duration of the change. When only one path is attached to the substrate 301 and the other path is suspended as shown in FIG. 3A, the device 300 will operate by measuring the Coriolis force.

Figure 3C:
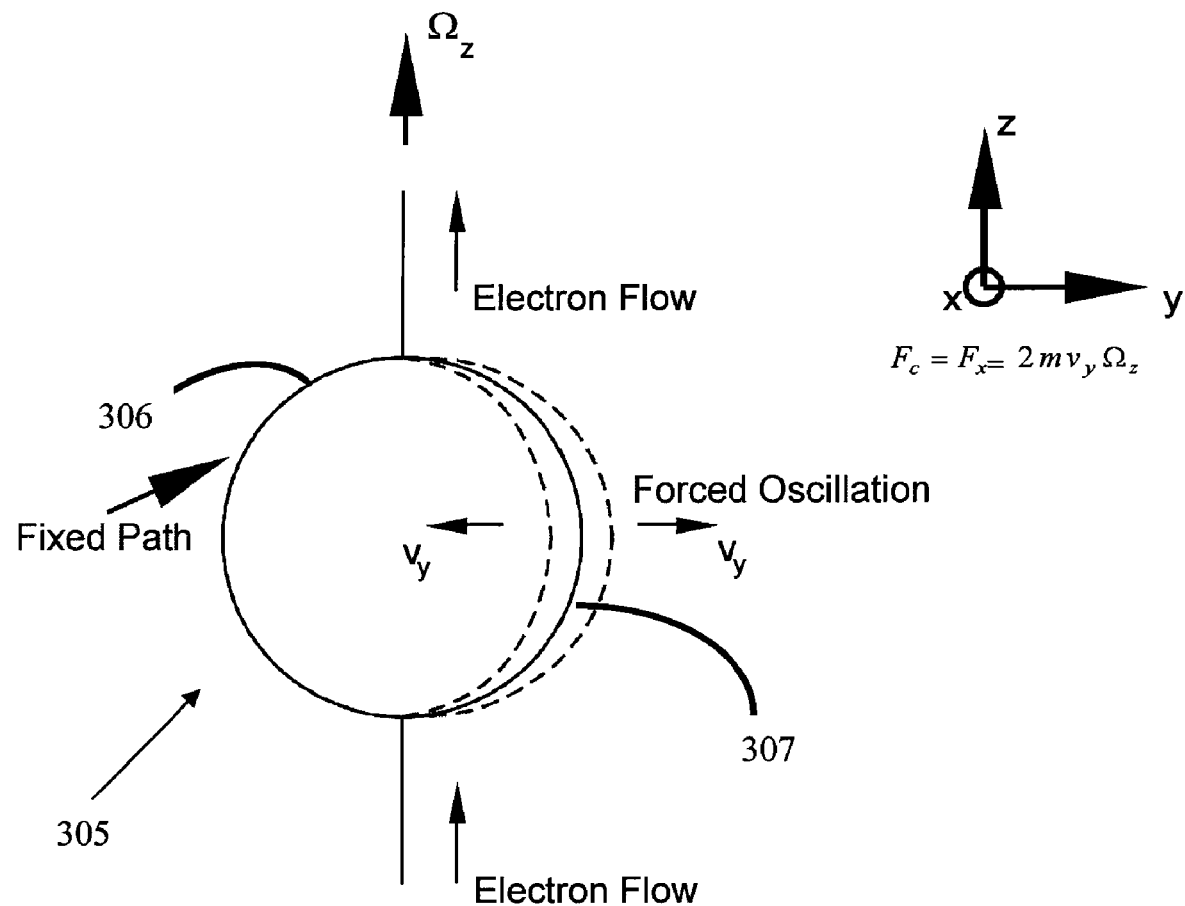
FIG. 3C shows the movable arm shown in FIGS. 3A and 3B forced into an in-plane oscillation with a velocity Vy. The corresponding Coriolis force resulting from a rotation will cause the movable arm to move in and out of the plane depending on the direction of the Coriolis force.

FIG. 3C shows movable arm 307 shown in FIGS. 3A and 3B forced into an in-plane oscillation with a velocity Vy. The corresponding Coriolis force resulting from a rotation will cause the arm 307 to move in and out of the plane depending on the direction of the Coriolis force. In this case the suspended arm 307 generally needs to be excited externally, either in plane or out of plane.

In another arrangement (not shown), both paths are suspended. In such an arrangement, the device can operate as in the both attached arrangement or only one path attached case as described above.

A preferred method of operating the gyros according to the invention is now described. Calibration is performed and calibration data stored to convert frequency or phase shift to angular acceleration. The input is an ac signal, such as in a range of frequencies from 10's of Hz into the MHz range. The range of amplitudes for the ac signal is flexible, ranging from sub picoVolts to Volts. Signal waveforms can be sinusoid or sawtooth. Current is measured using any suitable technique and the resulting frequency or phase shift is calculated and is then related to angular acceleration.

Figure 4A:
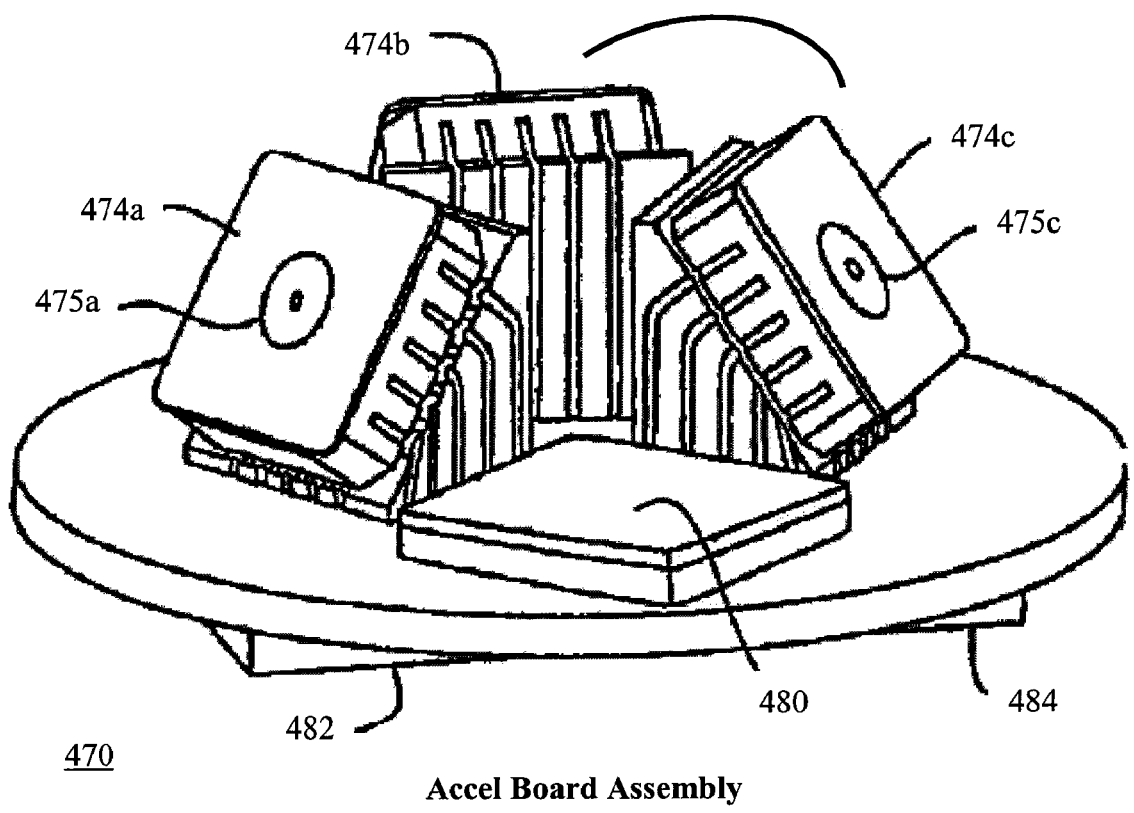
FIG. 4A shows an exemplary acceleration board assembly.
Figure 4B:
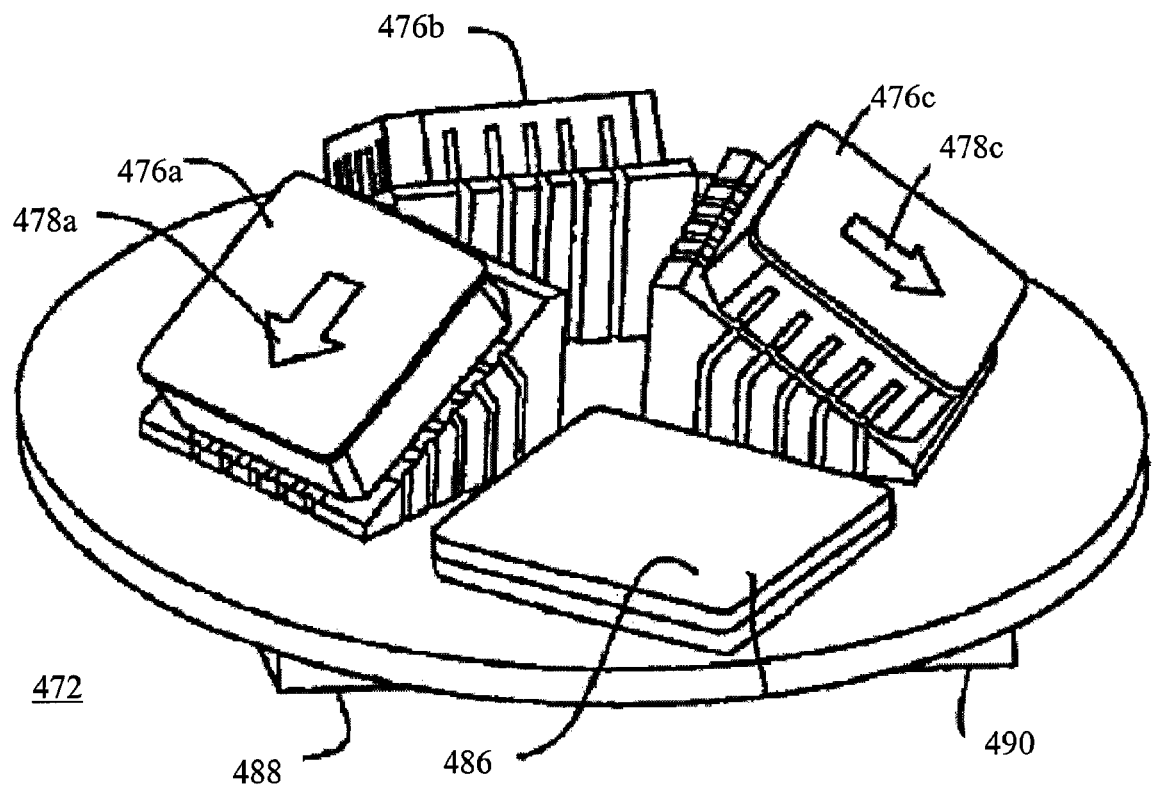
FIG. 4B shows an exemplary gyro board assembly.

FIG. 4A shows an accelerometer board assembly 470, while FIG. 4B shows a gyro board assembly 472. Accelerometer board assembly 470 includes three accelerometers 474a, 474b, and 474c that are each oriented orthogonally to each other as indicated in part by markings 475a and 475c in which like parts have been given like numbers accompanied by a lower-case "a".

Gyroscope board assembly 472 includes three gyroscopes 476a, 476b, and 476c that are also oriented orthogonally to each other as indicated in part by lines 478a and 478c. Gyroscopes 476a, 476b, and 476c can be NEMS gyroscopes 200 and 300 shown in FIG. 2 or 3, respectively.

Accelerometer board assembly 470 includes logic circuits such as a field programmable gate array (FPGA) 480 and application-specific integrated circuits (ASICs) 482 and 484. Gyroscope board assembly 472 also includes logic circuits such as field programmable gate array 486 and application-specific integrated circuits 488 and 490.

A block diagram of an exemplary navigation system 500 based on the present invention is shown in FIG. 5. System 500 includes elements from inner gimbal 538a, outer gimbal 536a, housing 532. On inner gimbal 538a, information from gyroscopes 576a-576c and accelerometers 574a-574c are sent to inner gimbal logic circuits 511, which include an analog digital converter (A/D), ASICs, and FPGAs. An output signal from a logic circuit 511 is transmitted to processor 551 located on housing 532a. Temperature sensor 552 on inner gimbal 538a transmits temperature information to processor 551. A resolver 514 on outer gimbal 536a transmits location information of their corresponding gimbal to processor 551. Processor 551 in turn transmits one or more signals to a control module 553 on housing 532a that transmits a signal to motors 562 and 540 on the outer gimbal 536a and inner gimbal 538a respectively, to control the orientation of each gimbal.

Processor 551 also accepts temperature information from temperature sensor 516 located on housing 532a about the housing temperature. In response to temperature information received from sensors 516 and 552, processor 551 transmits a signal to temperature controller 554 which controls the operations of coolers 539 on housing 532a and heater 518 on inner gimbal 538a. Processor 551 also controls operation of a power control and conditioner module 520 that provides the appropriate voltages to electronics on inner gimbal 538a, outer gimbal 536a and housing 532a.

In dynamic environments such as experienced by a jet fighter, the gravity will can be masked by the aircraft's body accelerations. In these cases the IMU is normally coupled with the GPS or other sensors.

Figure 6:
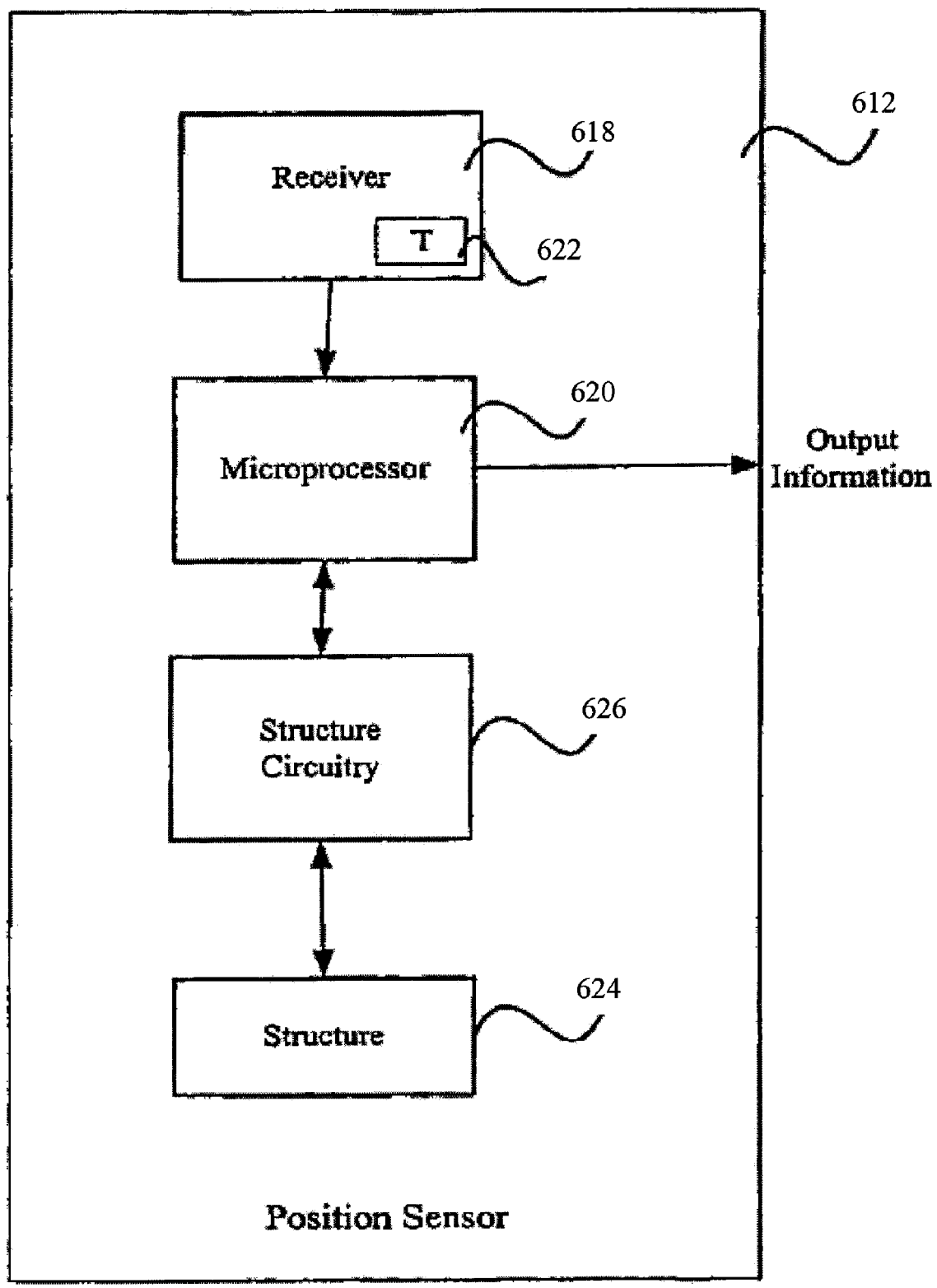
FIG. 6 schematically shows an exemplary position sensor produced in accordance with an embodiment of the invention.

FIG. 6 schematically shows a single chip MEMS position sensor 612 including a GPS circuit. More specifically, the position sensor 612 includes a conventional radio frequency ("RF") receiver 618 to receive and process high frequency timing signals (e.g., greater than about 15-20 GHz) from orbiting satellites 616, and microprocessor 620 to calculate position information based upon the received timing signals. Both the receiver 618 and microprocessor 620 may be considered to comprise the GPS portion of the single chip position sensor 612.

As noted above, the receiver 618 includes conventionally known high performance circuitry to accomplish its function (e.g., to amplify and digitize high frequency analog position signals from the satellites 616), being capable of adequately processing a signal having a frequency that is substantially equal to or greater than about 200-400 MHz. The noted position signals, which typically have frequencies approximately equal to or greater than about 1.5 GHz, thus are processed by high performance circuitry. An exemplary GPS device that can be implemented on the disclosed position sensor 612 may be obtained from Motorola, Inc. Schaumburg, Ill.

In accordance with illustrative embodiments of the invention, the position sensor 612 also includes conventional structure 624 (e.g., an oscillating beam) for detecting its actual motion (and thus, the object being tracked), and conventional structure circuitry 626 to control and detect movement of such structure 624. Both the structure 624 and structure circuitry 626 may be considered to comprise the IMU portion of the single chip position sensor 612.

As noted above, the structure 624 and structure circuitry 26 cooperate to detect motion of the position sensor 612. Accordingly, the structure 624 may include one or both of a gyroscope to detect rotational movement, and an accelerometer to detect linear acceleration and deceleration. The embodiment having both a gyroscope and an accelerometer, for example, thus includes structure circuitry 626 for both actuating a proof mass, and detecting capacitive changes produced when the proof mass and other structure move. The gyroscopes are based gyroscopes based on the invention such as based on nanoconstrictions (FIG. 2) or interferometers (FIG. 3). Such information then may be forwarded to the microprocessor 620 (e.g., via a position signal) for determining the actual location of a tracked object.

Once preferably formed on a single die/chip, the position sensor 612 may be enclosed within a conventional MEMS package. The various components of the sensor 612 may connect with pins (on the package) that permit, among other things, data control and transmission between the sensor components and an external device. For example, the external device may be another microprocessor and color display device to graphically show position information to an end user. In addition, the external device also may include a transponder to transmit the position information to a remote location, and receive other information (e.g., configuration information) from a remote source.

In addition to the embodiments described above, the invention includes alternate configurations, geometries and structures that will be apparent to those having ordinary skilled in the art. Alternative exemplary geometries include, but are not limited to:

(i) Multi-path geometries
(ii) Additional nanomechanical loop geometries such as square loops, and three dimensional loops.

(iii) Loops with both paths attached to the substrate or both suspended.

(iv) Use alternate materials for the device to optimize electron interference effects.

(v) Use a configuration for two or three dimensional arrays.

The present invention will have a variety of commercial applications. Applications will include applications that require gyros and accelerometers, such as for navigation, guidance, and geolocation.

EXAMPLES

It should be understood that the Example described below is provided for illustrative purposes only and does not in any way define the scope of the invention.

Figure 7:
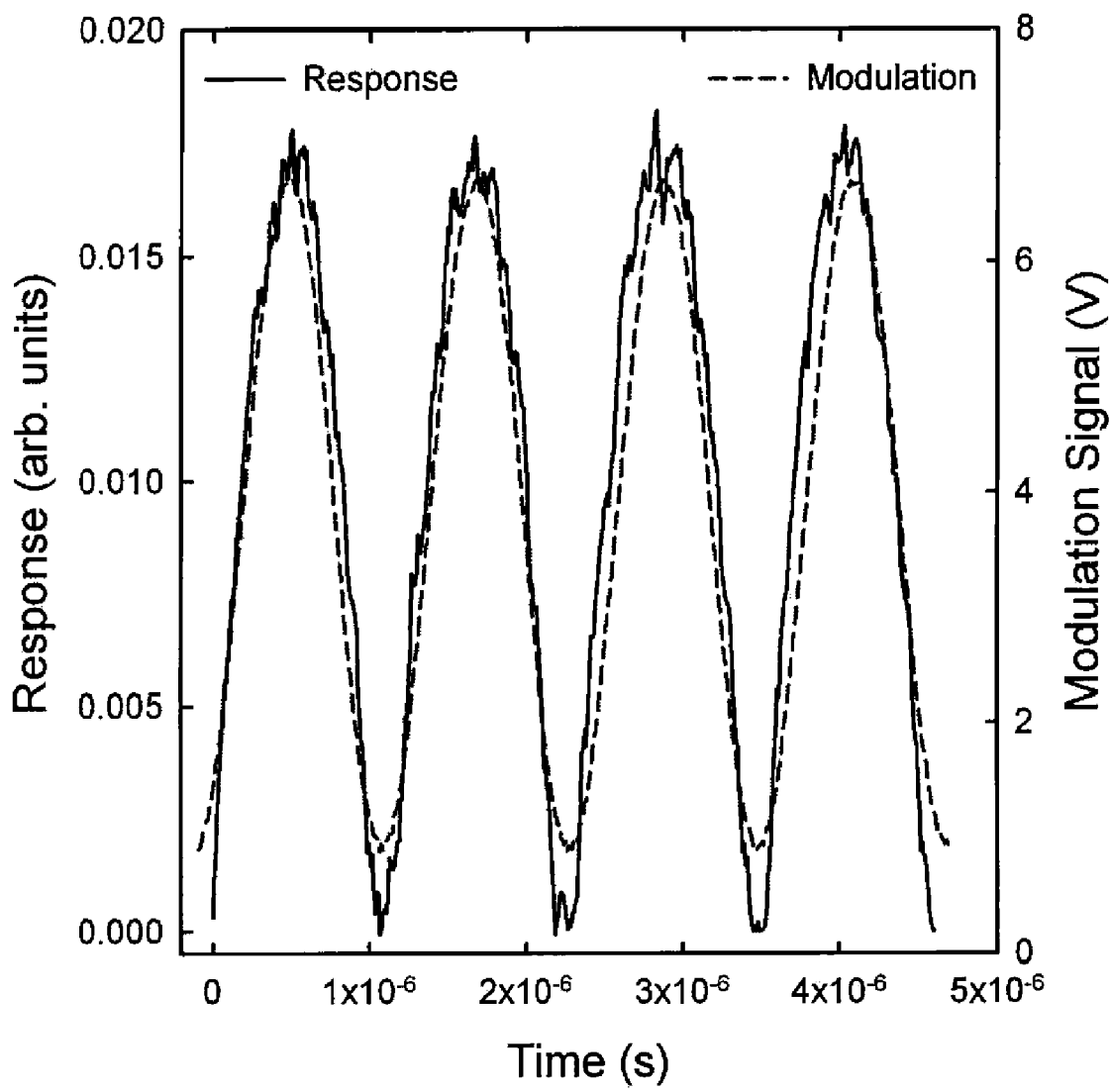
FIG. 7 is observed modulation data of electrical current resulting from oscillation of a gyroscope embodied as a suspended nanoconstriction responsive to irradiation by an actuating laser source which induces movement of the nanoconstriction.

FIG. 7 shows measured modulation data of electrical current resulting from oscillation of a gyroscope embodied as a suspended nanoconstriction responsive to irradiation by an actuating laser source. The electron current is shown by the solid curve. The sinusoidal modulated power waveform of the actuating laser source is shown by the dashed curve. The measured current is offset and normalized so that the average dc current is zero. It can be seen that the measured current exhibits a non-sinusoidal behavior thus evidencing a measurable phase shift.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A nanomechanical (NEMS) gyroscope, comprising:
an integrated circuit substrate;
a pair of spaced apart contact pads disposed on said substrate, and
a movable nanoscale element forming at least a portion of a first electrically conductive path electrically coupling said contact pads, wherein said movable element experiences movement comprising rotation, changes in rotation, or oscillation upon said gyroscope experiencing angular velocity or angular acceleration, said movement inducing phase changes in current flow through said movable element.

2. The gyroscope of claim 1, wherein said gyroscope is a three axis gyroscope comprising three one-axis gyroscopes, each of said one-axis gyroscopes positioned such that a measuring axis for each of said one-axis gyroscopes is orthogonal to a measuring axis for other of said one-axis gyroscopes.

3. The gyroscope of claim 1, wherein said movable element comprises a suspended nanoconstriction.

4. The gyroscope of claim 3, wherein said nanoconstriction is <50 nm wide.

5. The gyroscope of claim 1, wherein said gyroscope comprises an interferometric arrangement comprising said first electrically conductive path and at least a second fixed electrically conductive pathway both coupling said contact pads.

6. The gyroscope of claim 5, wherein said second pathway is secured to said substrate.

7. An inertial measurement unit (IMU), comprising:
a three axis accelerometer for detecting acceleration and deceleration for all three orthogonal measuring axes, and
a three axis gyroscope formed on an integrated circuit substrate, said gyroscope for measuring rotational rates along all three orthogonal rotational axes, said gyroscope comprising:
a pair of spaced apart contact pads, and
a movable nanoscale element forming at least a portion of a first electrically conductive path electrically coupling said contact pads, wherein said movable element experiences movement comprising rotation, changes in rotation, or oscillation upon said gyroscope experiencing angular velocity or angular acceleration, said movement inducing phase changes in current flow through said movable element.

8. The IMU of claim 7, further comprising a GPS circuit.

9. The IMU of claim 8, wherein said accelerometer and said GPS circuit are disposed on said substrate.

10. The IMU of claim 7, further comprising:
a gyro logic circuit on said substrate responsive to said three-axis gyroscope for producing an inertial angular rate about said three axes;
an accelerometer logic circuit on said substrate responsive to said three-axis accelerometer for producing a non-gravitational acceleration along each accelerometer input axis; and
a processor on said substrate responsive to said gyroscope logic circuit and said accelerometer logic circuit for determining attitude and position.

11. The IMU of claim 7, wherein said movable element comprises a nanoconstriction.

12. The IMU of claim 7, wherein said nanoconstriction is <50 nm wide.

13. The IMU of claim 7, wherein said gyroscope comprises an interferometric arrangement comprising said first electrically conductive path and at least a second fixed electrically conductive pathway both coupling said contact pads.

14. The gyroscope of claim 13, wherein said second pathway is secured to said substrate.

15. A method for detecting angular velocity or angular acceleration, comprising the steps of:
forcing an alternating current through a nanomechanical (NEMS) gyroscope comprising an integrated circuit substrate, a pair of spaced apart contact pads disposed on said substrate, and a movable nanoscale element forming at least a portion of a first electrically conductive path electrically coupling said contact pads,
measuring a change in at least one parameter of said alternating current resulting from rotation or oscillation of said moveable nanoscale element upon angular velocity or angular acceleration of said gyroscope, said oscillation or rotation inducing phase changes in current flowing through said moveable nanoscale element, and
determining said angular velocity or angular acceleration from said parameter.

16. The method of claim 15, wherein said moveable nanoscale element is a suspended element.

* * * * *